Patented Jan. 20, 1959

2,870,180

PROCESS FOR THE PREPARATION OF HYDRO-
CARBON MANGANESE CARBONYL COM-
POUNDS

John Kozikowski and Melvin L. Larson, Royal Oak,
Mich., assignors to Ethyl Corporation, New York,
N. Y., a corporation of Delaware No Drawing. Application October 13, 1955
Serial No. 540,348

4 Claims. (Cl. 260—429)

This invention relates to a process for the synthesis of hydrocarbon manganese carbonyl compounds. In particular, this invention relates to a process for the synthesis of cyclopentadienyl-type manganese tricarbonyl compounds hereinafter called cyclomatic manganese tricarbonyl compounds.

A novel type of cyclomatic manganese tricarbonyl compound in which the manganese is bonded to an organic or hydrocarbon radical by a carbon-to-manganese bond through carbons which form part of a five-membered cyclopentadienyl-type ring have been recently discovered. These compounds have been found to be useful as additives to lubricating oils and hydrocarbon fuels for the purpose of improving their lubricating and combustion properties, as well as for other uses. The discovery of these new compounds has disclosed a need for a suitable method of synthesizing them.

It is therefore an object of our invention to provide a process for the preparation of cyclopentadienyl-type manganese tricarbonyl compounds. It is also an object of this invention to provide a process for the synthesis of cyclopentadienyl-type manganese tricarbonyl compounds which can be conducted at low or atmospheric pressures. Another object of this invention is to provide a method for the synthesis of cyclomatic manganese tricarbonyl compounds which utilizes readily available carbon monoxide donors. Additional objects of this invention will become apparent from the discussion which follows.

The above and other objects of this invention are accomplished by a process for the preparation of hydrocarbon cyclomatic manganese tricarbonyl compounds having the general formula $$RMn(CO)_3$$

wherein R is a cyclomatic hydrocarbon radical having 5 to 17 carbon atoms which embodies a group of five carbons having the general configuration found in cyclopentadiene, said compounds being further characterized in that the cyclomatic hydrocarbon radical is bonded to the manganese by carbon-to-manganese bonds through the carbons comprising the cyclopentadienyl-group configuration, comprising reacting a manganese compound having the general formula $$RMnR'$$

wherein R and R' have the composition defined for R above, with a metal carbonylic compound having the general formula $$M_a(CO)_bX_cR_dH_f$$

wherein M is a metal having an atomic number of from 23 to 79, selected from groups I–B, V–B, VI–B, VII–B and VIII; X is a halogen having an atomic number of from 9 to 53; R is as defined above; $a$ is a number from 1 to 4 inclusive; $b$ is a number from 1 to 12 inclusive; $c$ has a numerical value of from 0 to 3 inclusive; $d$ has a numerical value of from 0 to 1 inclusive; $f$ has a numerical value of from 0 to 2 inclusive, and the sum $a+b+c+d+f$ has a value of from 3 to 15 inclusive.

Thus, our invention includes a process for the synthesis of compounds having the general formula $$RMn(CO)_3$$

comprising reacting a manganese compound having the general formula $$RMnR'$$

with a metal carbonylic compound having the general formula $$M_a(CO)_b$$

wherein M is a metal selected from a group consisting of groups VI–B, VII–B and VIII of the periodic table and having atomic numbers within the range of from 24 to 78, wherein $a$ has a numerical value of from 1 to 4 inclusive and $b$ has a numerical value of from 3 to 12 inclusive. Examples of the metal carbonylic compounds are $Fe(CO)_5$, $[Co(CO)_3]_4$, and $[Rh_4(CO)_{11}]_m$. The above is a case where, in the general formula $$M_a(CO)_bX_cR_dH_f$$

$c=d=f=0$. This is the preferred method of carrying out the synthesis of the cyclopentadienyl-type manganese tricarbonyl compounds. Of the metal carbonyls, the group VIII metal carbonyls, such as $Fe(CO)_5$, are preferred.

Our invention also includes the process for making compounds having the general formula $RMn(CO)_3$ comprising reacting a manganese compound having the general formula $$RMnR'$$

with a metal carbonylic compound having the general formula $$M_a(CO)_bX_cH_f$$

wherein M is a metal chosen from a group consisting of groups I–B, VII–B and VIII of the periodic table, having atomic numbers within the range of from 25 to 79, wherein $a$ has a numerical value of 1 to 2 inclusive, $b$ has a numerical value of from 1 to 5 inclusive, $c$ has a numerical value of from 1 to 3 inclusive, and $f$ has a numerical value of from 0 to 1 inclusive. Examples of these metal carbonylic compounds are $Re(CO)_5Br$, $H[Pt(CO)I_3]$ and $Au(CO)Cl$. This is a case where, in the general formula $M_a(CO)_bX_cR_dH_f$, the letter $d=0$.

Our invention likewise includes a process for the preparation of compounds having the general formula $$RMn(CO)_3$$

comprising reacting a manganese compound having the general formula $$RMnR'$$

with a metal carbonylic compound having the general formula $$M_a(CO)_bH_f$$

wherein M is a metal selected from the group consisting of groups VII–B and VIII of the periodic table having atomic numbers within the range of from 25 to 77, and wherein $a$ has a numerical value of 1, $b$ has a numerical value of from 4 to 5 inclusive, and $f$ has a numerical value of from 1 to 2 inclusive. Examples of these metal carbonylic compounds are $HRe(CO)_5$ and $HIr(CO)_4$. This is a case where, in the general formula $M_a(CO)_bX_cR_dH_f$, $c=d=0$ Our invention also includes a process for the manufacture of compounds having the general formula $$RMn(CO)_3$$

comprising reacting a manganese compound having the general formula $$RMnR'$$

with a metal carbonylic compound having the general formula $$M_a(CO)_b R_d H_f$$

wherein M is a metal selected from the group consisting of groups V–B, VI–B and VIII of the periodic table, having atomic numbers within the range of from 23 to 78, and wherein $a$ has a numerical value of 1, $b$ has a numerical value of from 2 to 4 inclusive, $d$ has a numerical value of 1, and $f$ has a numerical value of 0 to 1 inclusive. Examples of metal carbonylic compounds of this kind are $(C_5H_5)V(CO)_4$ and $(C_9H_7)Pt(CO)H$. This is a case where, in the general formula $M_a(CO)_b X_c R_d H_f$, $c$ has a numerical value of zero.

An example of the process of this invention is the reaction of bis(cyclopentadienyl)manganese with iron pentacarbonyl to give cyclopentadienyl manganese tricarbonyl. Other examples are given hereinbelow.

Our process has the advantages of low pressure operability and high yield of the desired $RMn(CO)_3$ products. An additional advantage is the production of valuable by-products.

The reaction can be carried out in either the condensed phase or the vapor phase. It is preferred, however, to carry out the reaction in the condensed phase, utilizing low pressure equipment. An advantage to a condensed phase reaction is that it can be carried out at a lower temperature, since it is not necessary to heat the reagents to vaporization temperature. It is especially prepared to react metal carbonylic compounds with cyclopentadienyl-type manganese compounds in the liquid medium in which the cyclomatic manganese compounds were prepared. An example of this is the preparation of bis(methylcyclopentadienyl)manganese by the reaction of methylcyclopentadienyl sodium with manganous chloride in an ether solution, such as tetrahydrofuran, and the addition of iron pentacarbonyl to the reaction mixture at temperatures within the range of 0 to 103° C. to produce methylcyclopentadienyl manganese tricarbonyl.

Our process is especially preferred for the synthesis of compounds in which at least one of the carbon-to-carbon double bonds in the cyclopentadienyl-group configuration is olefinic in nature. In other words, in this preferred embodiment not more than two carbons of the cyclopentadienyl ring should be shared with a fused aromatic ring such as a benzene ring. An example of one of the cyclomatic radicals of this preferred embodiment is the indenyl radical

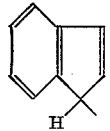

When R and R', the cyclomatic radicals, have this type of configuration or structure, that is, where at least one double bond in the cyclopentadienyl-group configuration is olefinic, the resulting cyclomatic manganese compounds are found to have the optimum characteristics for use as fuel and lubricating oil additives.

The cyclopentadienyl part of the molecules prepared by our invention consist of a cyclopentadienyl nucleus, the carbon skeleton of which can have other organic or hydrocarbon substituents thereon having up to 12 or more carbon atoms.

When a cyclomatic radical of the compounds prepared by the process of our invention is substituted with univalent aliphatic radicals, these substituents can be radicals having from 1 to about 12 or more carbon atoms, selected from the group consisting of alkyl, alkenyl, aralkyl and aralkenyl. Thus, when these substituents are univalent aliphatic radicals, they can be alkyl radicals, such as methyl, ethyl, n-propyl, isopropyl, n-butyl, isobutyl, sec-butyl, t-butyl, n-amyl, the various positional isomers thereof as, for example, 2-methylbutyl; 1,1-dimethylpropyl; 1-ethylpropyl, and the corresponding straight and branched chain isomers of hexyl, heptyl, octyl, nonyl, decyl, undecyl, dodecyl, tetradecyl, hexadecyl, nondecyl, eicosyl and the like. Likewise, the univalent aliphatic substituent can be an alkenyl radical, such as ethenyl, $\Delta^1$-propenyl, $\Delta^2$-propenyl, isopropenyl, $\Delta^1$-butenyl, $\Delta^2$-butenyl, $\Delta^3$-butenyl, and the branched chain isomers thereof as $\Delta^1$-butenyl, $\Delta^2$-isobutenyl, $\Delta^1$-sec-butenyl, $\Delta^2$-sec-butenyl, $\Delta^1$-pentenyl, $\Delta^2$-pentenyl, and the branched chain isomers thereof $\Delta^1$-hexenyl, $\Delta^3$-hexenyl, $\Delta^4$-hexenyl, and the branched chain isomers thereof, including 3,3-dimethyl-$\Delta^1$-butenyl; 2,3-dimethyl-$\Delta^2$-butenyl, and 1-methyl-1-ethyl-$\Delta^2$-propenyl, and the various isomers of heptenyl, octenyl, nonenyl, decenyl, undecenyl, dodecenyl, tetradecenyl, heptadecenyl, octodecenyl, eicosenyl, and the like.

When the organic radical substituted in the cyclomatic group is a univalent aliphatic radical, it can be an aralkyl radical such as, for example, benzyl, α-phenylethyl, β-phenylethyl, α-phenylpropyl, α-phenylisopropyl, α-phenylbutyl, α-phenylisobutyl, β-phenyl-tert-butyl, α'-naphthylmethyl, β'-naphthylmethyl, α-(α'-naphthyl)propyl, α-(β'-naphthyl)isopropyl, γ-(α'-naphthyl)butyl, α-(α'-naphthyl)isobutyl, β-(β'-naphthyl)-sec-butyl, the corresponding α'- and β'-naphthyl derivatives of n-amyl and the various positional isomers thereof, and the like. Other such aralkyl radicals include the α'-, β'-, and γ'-anthryl derivatives of alkyl radicals such as α'-anthrylmethyl, β-(γ'-anthryl)ethyl, Δ-(β'-anthryl)-2-methylamyl, and the like, and the corresponding alkyl derivatives of phenanthrene, fluorene, acenaphthene, chrysene, pyrene, triphenylene, naphthacene, etc. The univalent aliphatic radical can be an aralkenyl radical such as α-phenylethenyl, β-phenylethenyl, α-phenyl-$\Delta^1$-propenyl, and the phenyl derivatives of the isomers of butenyl, pentenyl, heptenyl, and the like, up to about eicosenyl. Other such arylalkenyls include α-(α'-naphthyl)-ethenyl, α-(β'-naphthyl)-ethenyl, α-(α'-naphthyl)-$\Delta^1$-propenyl, α-(α'-naphthyl)-$\Delta^2$-propenyl, α-(β'-naphthyl)-isopropenyl, and the like. In addition, such aromatic derivatives of alkenyls, that is, aralkenyl radicals, include derivatives of phenanthrene, fluorene, acenaphthene, chrysene, naphthacene, and the like.

When the organic radicals comprising the substituents in the cyclomatic groups are univalent alicyclic radicals, these can be radicals selected from the group consisting of cycloalkyl and cycloalkenyl radicals. Thus, such univalent alicyclic radicals can be cycloalkyl radicals such as, for example, cyclopropyl, cyclobutyl, cycloamyl, cyclohexyl, cyclononyl, cycloadecyl, cyclododecyl, cyclooctodecyl, cycloeicosyl, and such cycloaliphatic radicals as α-cyclopropylethyl, α-cyclobutylpropyl, and the like. Similarly, the alicyclic radical substituents can be cycloalkenyl radicals such as α-cyclohexylethenyl, α-cycloheptyl-$\Delta^1$-propenyl, β-cyclooctyl-$\Delta^2$-propenyl, α-methylene-β-cyclododecylethyl, and the like.

When the organic radicals substituted in the cyclomatic groups of the compounds made by our process are univalent aromatic radicals, they can be selected from the group consisting of aryl and alkaryl radicals. Thus, these univalent aromatic radicals can be aryl radicals such as, for example, phenyl, naphthyl, anthryl, and the like, including the various monovalent radicals of such aromatics as indene, acenaphthene, fluorene, naphthacene, chrysene, and the like. Moreover, these univalent aromatic radicals can be alkaryl radicals such as, for example, tolyl, 3,5-xylyl, p-cumenyl, mesityl, ethylphenyl, 2-methyl-α-naphthyl, 1-ethyl-β-naphthyl, and the like.

Having amply described the meaning of the term "organic radical," the discussion with regard to cyclomatic radicals has been facilitated. As stated hereinabove, the cyclomatic groups of the compounds of the present invention can be represented by four general formulae.

The first class of cyclomatic radicals can be represented by the general formula

(I)

wherein each of $R_1$, $R_2$, $R_3$, $R_4$ and $R_5$ can be the same or different and is selected from the group consisting of hydrogen and organic or hydrocarbon radicals having from about 1 to about 12 or more carbon atoms. Illustrative examples of such cyclomatic radicals include cyclopentadienyl; methylcyclopentadienyl; 1,2-dimethylcyclopentadienyl; ethylcyclopentadienyl; 1,3,4-tripropylcyclopentadienyl; 1,5-diphenylcyclopentadienyl; 1-methyl-3-tert-butylcyclopentadienyl; isopropenylcyclopentadienyl; 1,2-di($\Delta^2$-isobutenyl)-cyclopentadienyl; 1-methyl-3-($\Delta^1$-pentenyl)-cyclopentadienyl; ($\beta$-phenylethyl)-cyclopentadienyl; cyclohexylcyclopentadienyl; phenylcyclopentadienyl; 1-ethyl-3-($\alpha$-methyl)-cyclopentadienyl; (o-tolyl)-cyclopentadienyl; acetylcyclopentadienyl, and the like.

The second type of cyclomatic radical is the indenyl-type radical represented by the general formula

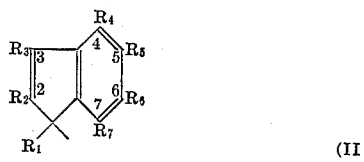
(II)

wherein each of $R_1$, $R_2$, $R_3$, $R_4$, $R_5$, $R_6$ and $R_7$ can be the same or different and is selected from the group consisting of hydrogen and organic and hydrocarbon radicals having from 1 to about 12 or more carbon atoms. Illustrative examples of such cyclomatic radicals include indenyl; 2-methylindenyl; 1-sec-butylindenyl; 3,4-diethenylindenyl; 5-($\alpha$-phenylbutyl)-indenyl; 1-cyclohexylindenyl; 1-phenylindenyl; 4,5-diphenylindenyl, and the like.

The third type of cyclomatic radical is a radical of the fluorenyl type which can be represented by the general formula

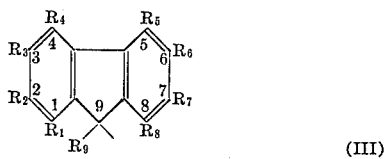
(III)

wherein each of $R_1$, $R_2$, $R_3$, $R_4$, $R_5$, $R_6$, $R_7$, $R_8$ and $R_9$ can be the same or different and is selected from the group consisting of hydrogen and organic and hydrocarbon radicals having from 1 to about 12 or more carbon atoms. Illustrative examples of such radicals include fluorenyl; 3-ethylfluorenyl; 4,5-dipropylfluorenyl; 9-methylfluorenyl; 6-ethenylfluorenyl; 4-benzylfluorenyl; 2-m-tolylfluorenyl, and the like.

The fourth type of cyclomatic radical, that is, a radical containing the cyclopentadienyl moiety can be represented by the general formula

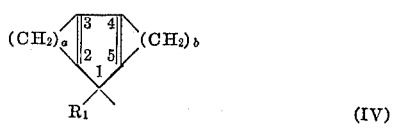
(IV)

wherein $a$ and $b$ can be the same or different and are small whole integers including zero and excluding one, the sum $a+b$ being at least two, and wherein $R_1$ is selected from the class consisting of hydrogen and organic radicals. Thus, when $a$ is zero, each of the carbon atoms designated as 2 and 3 have attached thereto a monovalent radical selected from the class consisting of hydrogen and organic radicals. Furthermore, the monovalent radicals so attached can be the same or different. The same discussion applies to each of the carbon atoms designated as 4 and 5 when $b$ is zero. Illustrative examples of this type of cyclomatic radical include 4,5,6,7-tetrahydroindenyl; 1,2,3,4,5,6,7,8-octahydrofluorenyl; 3-methyl-4,5,6,7-tetrahydroindenyl, and the like.

Non-limiting examples of the compounds prepared by the process of our invention in which the cyclomatic radical has the configuration shown in Structure I above are cyclopentadienyl manganese tricarbonyl; methylcyclopentadienyl manganese tricarbonyl; ethylcyclopentadienyl manganese tricarbonyl; propylcyclopentadienyl manganese tricarbonyl; butenylcyclopentadienyl manganese tricarbonyl; tert-butylcyclopentadienyl manganese tricarbonyl; hexylcyclopentadienyl manganese tricarbonyl; cyclohexylcyclopentadienyl manganese tricarbonyl; heptylcyclopentadienyl manganese tricarbonyl; decylcyclopentadienyl manganese tricarbonyl; dodecylcyclopentadienyl manganese tricarbonyl; 1,2,3,4-tetramethylcyclopentadienyl manganese tricarbonyl; 1,2,3,4,5-pentamethylcyclopentadienyl manganese tricarbonyl; 1,3-dibutylcyclopentadienyl manganese tricarbonyl; 1,2-dipropyl-3-cyclohexylcyclopentadienyl manganese tricarbonyl; tolylcyclopentadienyl manganese tricarbonyl; 1,3-diphenylcyclopentadienyl manganese tricarbonyl; acetylcyclopentadienyl manganese tricarbonyl, and the like.

When there is only one organo or hydrocarbon substituent on the cyclopentadienyl ring, its position is not specified since, according to theory, the cyclopentadienyl ring or group is bonded to the manganese by five equivalent bonds running from each of the five carbons in the cyclopentadienyl ring to the manganese. Since all these bonds are equivalent and all five carbons in the ring are equidistant from the manganese, it is immaterial to which of the five carbons a single substituent is attached. When, however, more than one substituent is attached to the cyclopentadienyl ring, the positions are given so as to indicate the relative positions of the different substituents with respect to each other on the cyclopentadienyl ring.

Examples of compounds having the configuration of Structure II given hereinabove are indenyl manganese tricarbonyl; 3-methylindenyl manganese tricarbonyl; 3-ethenylindenyl manganese tricarbonyl; 2,3-dimethylindenyl manganese tricarbonyl; 1,3-diethylindenyl manganese tricarbonyl; 1,7-diisopropylindenyl manganese tricarbonyl; 1,2,3,4,5,6,7-heptamethylindenyl manganese tricarbonyl; 5-phenylindenyl manganese tricarbonyl; 3(2-ethylphenyl)indenyl manganese tricarbonyl, etc.

Examples of compounds having the configuration of Structure III above are fluorenyl manganese tricarbonyl; 3-ethylfluorenyl manganese tricarbonyl; 4-propylfluorenyl manganese tricarbonyl; 2,3,4,7-tetramethylfluorenyl manganese tricarbonyl, and the like.

Examples of compounds having the cofinguration of Structure IV above are 4,5,6,7-tetrahydroindenyl manganese tricarbonyl; 3-methyl-4,7-dihydroindenyl manganese tricarbonyl; 2-ethyl-3-phenyl-4,5,6,7-tetrahydroindenyl manganese tricarbonyl; 1,2,3,4,5,6,7,8-octahydrofluorenyl manganese tricarbonyl; 1,4,5,8-tetrahydrofluorenyl manganese tricarbonyl, and the like.

The cyclopentadienyl-type manganese compounds that are employed in this process, as stated hereinabove, have the general formula RMnR′. Non-limiting examples of these cyclopentadienyl manganese compounds are bis-(cyclopentadienyl)manganese; cyclopentadienyl-methylcyclopentadienyl manganese; bis(methylcyclopentadienyl)manganese; bis(ethylcyclopentadienyl)manganese; bis(amylcyclopentadienyl)manganese; ethylcyclopentadienyl-amylcyclopentadienyl manganese; bis(phenylcyclopentadienyl)manganese; bis(dodecylcyclopentadienyl)-manganese; 1,3,5-trimethylcyclopentadienyl)manganese; bis(indenyl)manganese; bis(tetrahydroindenyl)manganese; bis(6-methylindenyl)manganese; cyclopentadienyl-indenyl manganese; bis(1-cyclohexylindenyl)manganese; bis(fluorenyl)manganese; methylcyclopentadienyl-fluorenyl manganese; indenyl-fluorenyl manganese; bis(6- ethenylfluorenyl)manganese; bis(4-benzyl)fluorenyl manganese; bis(1,2,3,4,5,6,7,8-octahydrofluorenyl)manganese.

The metal carbonylic compounds employed in this process are metal carbonyls, metal carbonyl halides, metal carbonyl hydrides, cyclomatic carbonylic compounds, and cyclomatic metal carbonyl hydrides composed of metals of groups I–B, V–B, VI–B, VII–B and VIII of the periodic table. For example, we can employ the group I–B carbonyl halide compounds such as Cu(CO)Cl. Likewise, we can employ the cyclopentadienyl group V–B metal carbonyl compounds such as, for example, $(C_5H_5)V(CO)_4$. We can also employ the group VB–I metal carbonyls and cyclomatic group VI–B metal carbonyl hydrides as, for example, $Cr(CO)_6$ and indenyl tungsten tricarbonyl hydride. Among the metal carbonylic compounds we can employ are included the group VII–B metal carbonyls as well as halide and hydride derivatives thereof as, for example, $Mn(CO)_5$, $Re(CO)_5Br$ and $HRe(CO)_5$. We also employ the carbonylic derivatives of the group VIII metals which include the metal carbonyls, the metal carbonyl halides, metal carbonyl hydrides, and the cyclomatic metal carbonylic compounds, as well as cyclomatic metal carbonyl hydrides and cyclomatic metal carbonyl halides, such as $Fe(CO)_5$, $(C_5H_5)Ni(CO)H$, etc. Further non-limiting examples of these compounds are:

METAL CARBONYLS

| | |
|---|---|
| $Cr(CO)_6$ | $[Ru(CO)_4]_3$ |
| $Mo(CO)_6$ | $Os(CO)_5$ |
| $W(CO)_6$ | $Os_2(CO)_2$ |
| $[Mn(CO)_5]_2$ | $[Co(CO)_4]_2$ |
| $[Re(CO)_5]_2$ | $[Co(CO)_3]_4$ |
| $Fe(CO)_5$ | $[Rh(CO)_4]_2$ |
| $Fe_2(CO)_9$ | $[Rh(CO)_3]_n$ |
| $[Fe(CO)_4]_3$ | $[Rh_4(CO)_{11}]_m$ |
| $Ru(CO)_5$ | $[Ir(CO)_4]_2$ |
| $Ru_2(CO)_9$ | $[Ir(CO)_3]_n$ |
| | $Ni(CO)_4$ |

METAL CARBONYL HALIDES

| | |
|---|---|
| $Mn(CO)_5X$ | $Co(CO)I_2$ |
| $Re(CO)_5X$ | $[Rh(CO)_2X]_2$ |
| $Fe(CO)_5X_2$ | $Ir(CO)_3X$ |
| $Fe(CO)_4X_2$ | $Ir(CO)_2X_2$ |
| $[Fe(CO)_3Br_2]_3$ | $[Pd(CO)Cl_2]_n$ |
| $Fe(CO)_2X_2$ | $H[Pd(CO)Cl_3]$ |
| $Fe(CO)_2I$ | $Pt(CO)_2Cl_2$ |
| $Ru(CO)_2X_2$ | $[Pt(CO)X_2]_2$ |
| $Ru(CO)Br$ | $H[Pt(CO)X_3]$ |
| $Os(CO)_4X_2$ | $Cu(CO)X$ |
| $Os(CO)_3X_2$ | $Ag(CO)Cl$ |
| $Os(CO)_2X_2$ | $Au(CO)Cl$ |
| $[Os(CO)_4X]_2$ | |

X=F, Cl, Br or I

METAL CARBONYL HYDRIDES

| | |
|---|---|
| $HMn(CO)_5$ | $HCo(CO)_4$ |
| $HRe(CO)_5$ | $HRh(CO)_4$ |
| $H_2Fe(CO)_4$ | $HIr(CO)_4$ |
| $H_2Os(CO)_4$ | etc. |

CYCLOPENTADIENYL-TYPE METAL CARBONYLIC COMPOUNDS

| | |
|---|---|
| $(C_5H_5)V(CO)_4$ | $(C_9H_7)W(CO)_3H$ |
| $(C_5H_5)Cr(CO)_3H$ | $[(C_9H_7)W(CO)_3]_2$ |
| $[(C_5H_5)Cr(CO)_3]_2$ | $((C_5H_5)Fe)_2(CO)_4$ |
| $(C_6H_7)Mo(CO)_3H$ | $(C_5H_5)Fe(CO)_2Cl$ |
| $(C_6H_7)_2Mo_2(CO)_5$ | $(C_5H_5)Co(CO)_2$ |
| $(C_5H_5)Pt(CO)H$ | |

In these compounds $(C_5H_5)$ represents a cyclopentadienyl group, $(C_6H_7)$ a methylcyclopentadienyl group and $(C_9H_7)$ an indenyl group. Other carbonylic compounds that can be used are those of the metals Nb, Tc and Ta.

The methods for the preparation of various metal carbonylic compounds is found in Inorganic Chemistry by Moeller, 1952 edition, published by John Wiley and Sons. The cyclopentadienyl metal carbonyl compounds used in our process are made by reacting the cyclopentadienyl metal compound with carbon monoxide at elevated pressures. For example, the reaction of bis(cyclopentadienyl) chromium with carbon monoxide and hydrogen under pressures of up to 200 atmospheres produces cyclopentadienyl chromium tricarbonyl hydride which melts with the evolution of hydrogen to form cyclopentadienyl chromium tricarbonyl. Another method is the reaction of metal carbonyl halide with an alkali metal derivative of the cyclopentadienyl compound to produce the cyclopentadienyl metal halide.

The general method of preparation of cyclopentadienyl-type manganese tricarbonyl compounds, according to this invention, is the reaction of cyclopentadienyl-type manganese compounds with metal carbonylic compounds. As stated hereinabove, the process can be carried out either in the vapor phase or the condensed phase. The following examples serve to illustrate our process.

Example I

CYCLOPENTADIENYL MANGANESE TRICARBONYL

A reaction vessel equipped with means for charging and discharging liquids and solids, gas inlet and outlet means, temperature measuring devices, heating and cooling means, means for agitation, and means for condensing vapors was flushed with pre-purified nitrogen. To the flask were then added 400 parts of tetrahydrofuran and 23 parts of sodium dispersed in 23 parts of mineral oil. An atmosphere of nitrogen was maintained in the reaction vessel throughout the run. To the vessel was added 66.7 parts of freshly-distilled cyclopentadiene in small increments with agitation while maintaining the temperature below 40° C. over a period of about two hours, when the completion of the formation of the sodium cyclopentadiene was evidenced by the cessation of hydrogen evolution. To this solution of cyclopentadienyl sodium in tetrahydrofuran was added 63 parts of anhydrous manganous chloride. The mixture was heated and maintained at reflux temperature for 20 hours. At the end of this time, the solvent was removed by distillation under reduced pressure and the product purified by sublimation at a pressure of about 2 mm. of mercury at about 130° C. producing 48.64 parts, 52.5% yield, of lustrous, brown-black bis(cyclopentadienyl)manganese crystals. The product was kept under an atmosphere of nitrogen to prevent oxidation by oxygen of the air.

To 46 parts of bis(cyclopentadienyl)manganese crystals in a reaction vessel equipped with temperature control means and means for refluxing liquids is slowly added 85 parts of iron pentacarbonyl at a temperature of substantially 20° C. The temperature of the reaction mixture is then slowly raised to 100° C. and maintained at that level for a period of about 20 hours. The reaction between bis(cyclopentadienyl)manganese and iron pentacarbonyl produces cyclopentadienyl manganese tricarbonyl, dicyclopentadienyl diiron tetracarbonyl, dicyclopentadienyl iron and small amounts of other cyclopentadienyl carbonyl derivatives of manganese and iron. The products are separated by fractional distillation and sublimation at reduced pressure. The cyclopentadienyl manganese tricarbonyl is a yellow, air-stable, water-insoluble solid having a melting point of 77° C. and corresponds to the formula $(C_5H_5)Mn(CO)_3$. The dicyclopentadienyl diiron tetracarbonyl, $(C_5H_5)_2Fe_2(CO)_4$, has a melting point of 194° C. and the bis(cyclopentadienyl) iron melts at 173–174° C.

A good yield is also obtained when the reaction of Example I between bis(cyclopentadienyl)manganese and iron pentacarbonyl is carried out at a temperature of 20° C. The reaction is also found to proceed at a temperature as low is 0° C. to give the product cyclopentadienyl manganese tricarbonyl.

Example II

Bis(methylcyclopentadienyl)manganese was prepared in a manner similar to the preparation of bis(cyclopentadienyl)manganese in Example I, except that the bis(methylcyclopentadienyl)manganese was not separated from the reaction product. Iron pentacarbonyl was added directly to the reaction mixture containing the bis(methylcyclopentadienyl)manganese and further reaction allowed to proceed at a temperature of substanitally 80° C. to produce methylcyclopentadienyl manganese tricarbonyl which is purified by fractional distillation at reduced pressures. The product is a yellow-orange liquid having a freezing point of —0.75° C., a refractive index ($n_d^{20}$) of 1.5873 and a density ($d_{20}^4$) of 1.3942. On analysis the compound is found to correspond to the formula $(C_6H_7)Mn(CO)_3$. The by-products are di(methylcyclopentadienyl)diiron tetracarbonyl, $$(C_6H_7)_2Fe_2(CO)_4$$

and bis(methylcyclopentadienyl)iron, $(C_6H_7)_2Fe$.

Similar results are obtained when a mixture of cyclopentadiene and methylcyclopentadiene are employed, producing a product consisting of a mixture of cyclopentadienyl manganese tricarbonyl and methylcyclopentadienyl manganese tricarbonyl.

When $Re(CO)_3Cl$ is used in place of $Fe(CO)_3$ in Example II, a good yield of methylcyclopentadienyl manganese tricarbonyl is likewise obtained.

Example III

The process of Example II is repeated employing ethylcyclopentadiene as the cyclomatic compound and dicyclopentadienyl diiron tetracarbonyl as the carbonyl donor. The reaction is carried out at 223° C. in butyl o-tolyl ether in place of tetrahydrofuran. The product obtained is ethylcyclopentadienyl manganese tricarbonyl.

Example IV

Employing the process of Example II with phenylcyclopentadiene as the cyclomatic compound, nickel tetracarbonyl as the carbonyl donor and a mixture of toluene and dioxane as the solvent, a good yield of phenylcyclopentadienyl manganese tricarbonyl is obtained when the reaction is conducted at temperatures within the range of 20–90° C.

Similar results are obtained when $Co(CO)_{3\ 4}$ is used in place of $Ni(CO)_4$.

Example V

Employing bis(indenyl)manganese and cyclopentadienyl vanadium tetracarbonyl as reactants in ethylene glycol diethyl ether in a process as described in Example I, in which the reaction is conducted at temperatures of substantially 170° C., indenyl manganese tricarbonyl is obtained as the product.

When $Ru(CO)_5$ is used in place of cyclopentadienyl vanadium tetracarbonyl and the process of Example V carried out at a temperature of 250° C., a good yield of indenyl manganese tricarbonyl is likewise obtained.

Example VI

The reaction of bis(fluorenyl)manganese with cyclopentadienyl chromium tricarbonyl hydride in allyl tolyl ether produces fluorenyl manganese tricarbonyl.

In similar manner, bis(2-ethyl-3-naphthylcyclopentadienyl)manganese reacts with copper carbonyl iodide, CuCOI, in a medium of benzene and ethyl ether to produce 2-ethyl-3-naphthylcyclopentadienyl manganese tricarbonyl.

Example VII

Bis(methylcyclopentadienyl)manganese and iron carbonyl are vaporized in separate containers and the vapors combined and passed into allyl tolyl ether in a reaction vessel maintained at a temperature of substantially 100° C. The combined stream of bis(methylcyclopentadienyl)manganese and the iron carbonyl is admitted into the reaction vessel below the surface of the ether. The ether serves as a reaction and heat transfer medium in which the manganese compound and the iron carbonyl react to for methylcyclopentadienyl manganese tricarbonyl, $$(C_6H_7)Mn(CO)_3$$

and by-products of iron, such as bis(methylcyclopentadienyl)iron and dimethylcyclopentadienyl diiron tetracarbonyl. The methylcyclopentadienyl manganese tricarbonyl product is separated from the reaction mixture by fractional distillation in good yield.

A variation of the procedure in Example VII comprises passing a stream of nitrogen or other inert gas through the bis(methylcyclopentadienyl)manganese compound as the latter is being vaporized. The inert nitrogen gas serves as a carrier for transporting the manganese compound to the reaction vessel where it reacts with the iron carbonyl compound. An inert carrier gas can be likewise employed to aid in the transportation of the iron pentacarbonyl vapors to the reaction vessel. Other inert gases employed with equal success are argon, helium, methane, ethane, etc. The requirement with respect to the characteristics of the carrier gas is that it does not react with either the reagents or the product which is obtained when the manganese compound and the carbonylic compound react. Similar results are obtained when other cyclomatic manganese compounds and other metal carbonylic compounds of the type named hereinabove are employed.

The vapors of the cyclomatic manganese compounds and the metal carbonylic compounds can also be passed into the reaction zone maintained at a suitable reaction temperature which is below the decomposition point of the reactants and the two compounds allowed to react without the presence of a liquid medium. The products of the type obtained in Example VII are produced. An example of this is the reaction of bis(methylcyclopentadienyl)-manganese with iron pentacarbonyl in the vapor state in a reaction zone at temperatures of substantially 110° C. in the presence of nitrogen gas as an inert carrier. This method is not quite as efficient as the reaction of the vapors below the surface of a liquid medium and smaller yields of the desired product are obtained.

Whether the process is carried out in a gaseous medium or in a liquid medium, the unreacted vapors of the cyclomatic manganese compound and the metallic carbonylic compound can be recycled. Mediums other than alkyl tolyl ether and nitrogen gas can be used as described more fully hereinbelow.

As stated above, our invention comprises reacting cyclopentadienyl-type manganese compounds with metal carbonylic compounds to produce cyclopentadienyl-type manganese tricarbonyl compounds. The bis(cyclopentadienyl-type) manganese compounds can be prepared in a number of ways. One method comprises reacting manganese salt, such as manganous chloride, with a cyclopentadienyl-type alkali metal compound. This method is illustrated in Example I. Another method of preparing bis(cyclopentadienyl-type)manganese compounds is the reaction of a cyclopentadienyl magnesium halide—known as a Grignard reagent—with a manganese salt, such as a manganous halide. An example of the latter is the reaction of manganous chloride with cyclopentadienyl magnesium chloride in an ether solvent to produce bis(cyclopentadienyl)manganese.

The bis(cyclopentadienyl-type)manganese compound need not be separated from the reaction mixture in which it is prepared. The metal carbonylic compound may be added directly to such a mixture as illustrated in Example II. A diluent or liquid medium is not necessary for the reaction between the cyclomatic manganese compound and the metal carbonylic compound as has been illustrated in Example I. However, when a medium is employed, it can consist of a hydrocarbon, an ether, or an inert gas, non-limiting examples of which are n-butyl ether, dodecyl ether, anisole, dioxane, tetrahydrofuran, ethylene glycol dimethyl ether, ethylene glycol diethyl ether, methylphenyl ether, diethyl ether, allyl tolyl ether, benzene, cyclohexane, toluene, xylene, nitrogen, argon, helium, methane, ethane, etc. A mixture of two or more of any of the above type of solvents or diluents can be employed as is the case when nitrogen is used as a carrier gas for transporting the vapors of the reactants into a reaction vessel containing an ether as a reaction medium. When hydrocarbon and ether solvents or diluents are employed, they may have up to 20 or more carbon atoms. An example is dodecyl ether having 24 carbon atoms.

The process of our invention can be carried out within the range of from below 0° C. to about 250° C. A preferred range is from 20° C. to about 200° C. as it is found that the reaction proceeds at a satisfactory rate in this range. The requirement in all cases is that the temperature be kept below the decomposition temperature of the reactants. When $Fe(CO)_5$ is employed, for example, the temperature should be not higher than 130° C.

The time required to obtain a particular yield of product, that is, the residence time of the reactants in the reaction vessel, varies depending on the particular mode in which our process is carried out. For example, when the reactants are reacted in the vapor phase in a thermal reactor, the residence time may be of an order of a few seconds. On the other hand, when the reaction is conducted in a liquid phase, the contact time may be a matter of 2 minutes to 20 hours, depending on the temperature used and the reactivity of the reagents employed.

One advantage of our process is that the reaction can be conducted at atmospheric pressure especially when the process is carried out in the liquid or condensed phase. However, the process is operable at pressures below atmospheric as well as at elevated pressures which may be as high as 20,000 atmospheres.

Our process has a number of advantages in addition to the benefit of low pressure operability. One of the added advantages is the higher yield of product obtained due to initimate contact of reactants especially when conducted in the liquid phase. Thus, cyclopentadienyl-type manganese tricarbonyl compounds are obtained without having to resort to special apparatus for contacting carbon monoxide gas under elevated pressures with cyclopentadienyl-type manganese compounds. Our process also produces valuable by-products. To illustrate, when cyclopentadienyl-type manganese compounds are reacted with group VIII-metal carbonyl compounds, the product contains, in addition to the cyclopentadienyl-type manganese tricarbonyl compounds, cyclopentadienyl-type group VIII metal compounds and cyclopentadienyl-type group VIII metal carbonyl compounds. For example, when iron pentacarbonyl is reacted with cyclopentadienyl manganese compounds, the by-products consist of dicyclopentadienyl diiron tetracarbonyl and bis(cyclopentadienyl)iron which can be separated from the reaction product by fractional distillation, sublimation, etc. One of the products when cobalt carbonyl, such as $[Co(CO)_4]_2$ is reacted with a cyclopentadienyl-type manganese compound, such as bis(methylcyclopentadienyl)manganese, is methylcyclopentadienyl cobalt dicarbonyl. In like manner, cyclopentadienyl derivatives are formed of other metal carbonylic compounds when the latter are reacted with manganese cyclopentadienyl-type compounds according to the process of our invention.

These cyclopentadienyl-type manganese tricarbonyl compounds prepared by the process of our invention are found to be exceptionally good agents for improving the antiknock quality of hydrocarbon fuels used in spark ignition engines. They can also be used as chemical intermediates in the synthesis of other manganese compounds.

A particular advantage of the manganese compounds produced by our process is the fact that by proper selection of the cyclopentadienyl group attached to the manganese, compounds having "tailormade" characteristics can be obtained. For example, cyclopentadienyl manganese tricarbonyl is a solid melting at 77° C., whereas methylcyclopentadienyl manganese tricarbonyl is a liquid at ordinary temperatures, such as 23° C. In like manner, the nature of the cyclopentadienyl group on the manganese affects the solubility of the compound in various hydrocarbon and other solvents. Thus, it is seen that our process can be used to make cyclomatic manganese tricarbonyl compounds which are better adapted for specific uses by choosing the right cyclopentadienyl group as a substituent.

Having fully described the process of this invention, the need therefor, and the best method for carrying out the process, we do not intend that our invention be limited except within the spirit and scope of the appended claims.

We claim:

1. A process for the preparation of hydrocarbon cyclomatic manganese tricarbonyl compounds having the general formula $$RMn(CO)_3$$

wherein R is a cyclomatic hydrocarbon radical having from 5 to 17 carbon atoms which embodies a group of 5 carbons having the general configuration found in cyclopentadiene, said compounds being further characterized in that the cyclomatic hydrocarbon radical is bonded to the manganese by carbon-to-manganese bonds through the carbons comprising the cyclopentadienyl-group configuration, said process comprising reacting a manganese compound having the general formula $$RMnR'$$

wherein R and R' have the composition defined for R above with a metal carbonylic compound having the general formula $$M_a(CO)_bX_cR_dH_f$$

wherein M is a metal having an atomic number of from 23 to 79, selected from groups I–B, V–B, VI–B, VII–B, and VIII, X is a halogen having an atomic number of from 9 to 53, R is as defined above, $a$ is a number from 1 to 4 inclusive, $b$ is a number from 1 to 11 inclusive, $c$ has a numerical value of from 0 to 3 inclusive, $d$ has a numerical value of from 0 to 1 inclusive, $f$ has a numerical value of from 0 to 2 inclusive, and the sum $a+b+c+d+f$ has a value of from 3 to 15 inclusive said process being conducted at temperature below the decomposition temperature of said metal carbonylic compound.

2. The process of preparing methylcyclopentadienyl manganese tricarbonyl, comprising reacting bis(methylcyclopentadienyl)manganese with iron pentacarbonyl at a temperature of substantially 80° C.

3. A process for the preparation of methylcyclopentadienyl manganese tricarbonyl comprising reacting manganous chloride with methylcyclopentadienyl sodium and subsequently reacting the reaction mixture thus obtained with iron pentacarbonyl at a temperature of substantially 80° C. and separating the methylcyclopentadienyl manganese tricarbonyl, di(methylcyclopentadienyl)iron and di(methylcyclopentadienyl)diiron tetracarbonyl products therefrom.

4. A process for the preparation of hydrocarbon cyclomatic manganese tricarbonyl compounds having the general formula $$RMn(CO)_3$$

wherein R is a cyclomatic hydrocarbon radical having from 5 to 17 carbon atoms which embodies a group of 5 carbons having the general configuration found in cyclopentadiene, said compounds being further characterized in that the cyclomatic hydrocarbon radical is bonded to the manganese by carbon-to-manganese bonds through the carbons comprising the cyclopentadienyl-group configuration, said process comprising reacting a manganese compound having the general formula RMnR' wherein R and R' have the composition defined for R above with a metal carbonylic compound having the general formula $M_a(CO)_b X_c R_d H_f$ wherein M is a metal having an atomic number of from 23 to 79, selected from groups I-B, V-B, VI-B, VII-B, and VIII, X is a halogen having an atomic number of from 9 to 53, R is as defined above, $a$ is a number from 1 to 4 inclusive, $b$ is a number from 1 to 11 inclusive, $c$ has a numerical value of from 0 to 3 inclusive, $d$ has a numerical value of from 0 to 1 inclusive, $f$ has a numerical value of from 0 to 2 inclusive, and the sum $a+b+c+d+f$ has a value of from 3 to 15 inclusive, said process being conducted at a temperature between about 0° to about 250° C.

References Cited in the file of this patent

UNITED STATES PATENTS

| | | |
|---|---|---|
| 2,791,597 | Anzilotti et al. | May 7, 1957 |
| 2,818,416 | Brown et al. | Dec. 31, 1957 |
| 2,818,417 | Brown et al. | Dec. 31, 1957 |

OTHER REFERENCES

Fischer et al.: "Zeit. für Naturfor.," Band 7B, Heft 7, July 1952, pp. 377–79.

Fischer et al.: "Zeit. für Naturforsch.," vol. 9B, page 618 (1954).

Mellor: "Mod. Inorg. Chem.," pp. 867–877, Longmans Green & Co., N. Y.

---

UNITED STATES PATENT OFFICE

Certificate of Correction

Patent No. 2,870,180            January 20, 1959

John Kozikowski et al.

It is hereby certified that error appears in the printed specification of the above numbered patent requiring correction and that the said Letters Patent should read as corrected below.

Column 2, line 12, for "$_a(CO)_b$" read —$M_a(CO)_b$—; column 5, lines 25 to 30, the formula should appear as shown below instead of as in the patent:

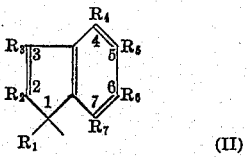

(II)

column 6, line 26, for "hydrocarbon" read —hydrocarbo—; column 7, line 12, for "VB-I" read —VI-B—; line 30, for "$Os_2(CO)_2$" read —$Os_2(CO)_9$—; column 9, line 27, for "$Re(CO)_3Cl$" read —$Re(CO)_5Cl$—; same line 27, for "$Fe(CO)_3$" read —$Fe(CO)_5$—; column 10, line 6, for "for" read —form—; column 12, line 9, for "hydrocarbon" read —hydrocarbons—.

Signed and sealed this 4th day of August 1959.

[SEAL]

Attest:
KARL H. AXLINE,
*Attesting Officer.*

ROBERT C. WATSON,
*Commissioner of Patents.*

UNITED STATES PATENT OFFICE
Certificate of Correction

Patent No. 2,870,180                                                              January 20, 1959

John Kozikowski et al.

It is hereby certified that error appears in the printed specification of the above numbered patent requiring correction and that the said Letters Patent should read as corrected below.

Column 2, line 12, for "$_a(CO)_b$" read —$M_a(CO)_b$—; column 5, lines 25 to 30, the formula should appear as shown below instead of as in the patent:

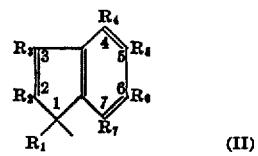

column 6, line 26, for "hydrocarbon" read —hydrocarbo—; column 7, line 12, for "VB–I" read —VI–B—; line 30, for "$Os_2(CO)_2$" read —$Os_2(CO)_9$—; column 9, line 27, for "$Re(CO)_3Cl$" read —$Re(CO)_5Cl$—; same line 27, for "$Fe(CO)_3$" read —$Fe(CO)_5$—; column 10, line 6, for "for" read —form—; column 12, line 9, for "hydrocarbon" read —hydrocarbons—.

Signed and sealed this 4th day of August 1959.

[SEAL]

Attest:
KARL H. AXLINE,
*Attesting Officer.*

ROBERT C. WATSON,
*Commissioner of Patents.*